United States Patent [19]

Connick

[11] 4,004,037
[45] Jan. 18, 1977

[54] PEANUT BUTTER MANUFACTURE
[75] Inventor: Francis G. Connick, Downers Grove, Ill.
[73] Assignee: Swift and Company Chicago, Ill.
[22] Filed: Oct. 25, 1974
[21] Appl. No.: 517,924
[52] U.S. Cl. .................................. 426/324; 241/8; 241/23; 426/393; 426/518; 426/633; 426/634
[51] Int. Cl.² ...................... A23L 1/36; A23L 1/38; B02C 19/00
[58] Field of Search .......... 426/473, 518, 524, 393, 426/633, 634, 397, 418, 419, 324; 241/17, 23, 8

[56] References Cited
UNITED STATES PATENTS

| | | | |
|---|---|---|---|
| 1,897,939 | 12/1933 | Martin | 426/524 |
| 1,924,059 | 8/1933 | Hoskins | 426/524 X |
| 2,044,639 | 6/1936 | Schneider et al. | 426/397 |
| 2,583,697 | 1/1952 | Hendry et al. | 426/518 |
| 2,681,279 | 6/1954 | Sloan et al. | 426/518 |
| 2,978,336 | 4/1961 | Morrison | 426/393 |
| 3,129,102 | 4/1964 | Sanders | 426/633 X |
| 3,261,689 | 7/1966 | Ponzoni | 426/388 X |
| 3,266,905 | 8/1966 | Baker et al. | 426/397 |
| 3,320,075 | 5/1967 | Lemmons | 426/393 |
| 3,452,936 | 7/1969 | Hanser | 241/23 X |
| 3,615,590 | 10/1971 | Avera et al. | 426/633 |
| 3,619,207 | 11/1971 | Dzurik et al. | 426/633 |
| 3,694,231 | 9/1972 | Izzo et al. | 426/518 X |
| 3,821,448 | 6/1974 | Parker et al. | 426/397 |

*Primary Examiner*—Steven L. Weinstein
*Attorney, Agent, or Firm*—Edward T. McCabe; Charles E. Bouton; Raymond M. Mehler

[57] ABSTRACT

Peanut butter is prepared that has an improved flavor and an increased shelf life. The peanuts are ground in the presence of solid carbon dioxide to reduce oxidation of the peanut oil during grinding and also to reduce the amount of oxygen that is dissolved, occluded, and adsorbed from the ingredients, thereby resulting in a final peanut butter of improved stability and also thereby effecting a retention of carbon dioxide in the final peanut butter to improve the flavor thereof.

14 Claims, No Drawings

PEANUT BUTTER MANUFACTURE

The present invention relates to a peanut butter type of product having improved flavor and increased shelf life and an improved process for manufacturing same in which the peanuts are ground in the presence of solid carbon dioxide.

Peanut butter manufacture includes the step of grinding or comminuting roasted peanuts, such as by single or multiple grindings thereof into minute particles. Peanut butter may contain only ground peanuts and peanut oil incident to grinding or may also contain other ingredients that are included along with the ground peanuts as very fine particles within an oily base. Conventionally produced peanut butter usually contains a significant amount of "free" oxygen. As used herein, free oxygen refers to that oxygen which has been adsorbed, occluded, and/or dissolved into the product. Much of this oxygen is introduced during the peanut comminuting step; it can also be introduced during the addition of other ingredients often included in peanut butter, such as sweeteners, edible oils, salts, and fat particles.

It has been recognized, for example, by Baker, et al, U.S. Pat. No. 3,266,905, that the shelf life of peanut butter is reduced by the presence of such adsorbed, occluded and dissolved oxygen that has been picked up by the peanut butter particles during processing. Such free oxygen increases the tendency for the peanut butter to develop rancidity and also a stale taste during shelf storage, both of which are believed to result from the oxidation of oils within the peanut butter.

Prior art teachings, such as Baker, et al., indicate that this undesirable free oxygen take-up can be reduced through the introduction of an inert gas, most notably nitrogen, during various stages throughout the manufacture of peanut butter. Such prior art techniques require complicated apparatus and the multiple introduction of the inert gas during various stages of the peanut butter production, and do not adequately prevent oxidation of oils in the peanut butter during manufacture, which oxidation is aggravated by the physical breakdown and heating incident to peanut butter manufacture, especially during the grinding steps.

It is therefore an object of this invention to prepare a peanut butter having increased shelf life and improved flavor by accomplishing grinding steps in the presence of solid carbon dioxide to inhibit dissolving, occlusion, and adsorption of free oxygen into the peanut butter.

A further object of this invention is to minimize the oxidation of oils and damage to ingredients as they are exposed to physical breakdown and heat during manufacture and the peanut butter produced thereby.

It is another object of the present invention to reduce the oxidation of, and simultaneously to keep at moderately cool temperatures, peanuts and peanut butter ingredients as they are comminuted for use in the manufacture of peanut butter.

An additional object of this invention is the minimizing of the dissolving, occluding, and adsorbing of free oxygen that tends to be introduced by peanut butter ingredients during the process of manufacturing the peanut butter.

Another object of this invention is a peanut butter product and method of producing same, which product has carbon dioxide gas included therein and is low in dissolved, occluded, and adsorbed oxygen to thereby reduce the opportunity for the peanut butter to acquire a stale taste over extended periods of shelf storage and to minimize the possibility of the development of rancidity throughout lengthy shelf storage.

The process of this invention relates to the manufacture of peanut butter and includes the comminuting of peanuts together with solid carbon dioxide. The present peanut butter product contains only trace amounts of occluded, dissolved and adsorbed oxygen.

Other objects and advantages of the present invention will be apparent to those skilled in the art from the detailed description of the invention as follows.

I have determined that the inclusion of solid carbon dioxide with peanuts when the peanuts are being comminuted during initial steps in the manufacture of peanut butter will improve both the stability and the flavor of the final peanut butter product or the like.

The present invention covers all types of spreadable nut or oil seed products. As used herein, the term peanut butter is meant to refer to all such products, including nut butters and nut spreads, made from nuts such as peanuts, walnuts, pecans and cashew nuts, further including oil seed butters and spreads such as those made from cottonseed, sunflower seed, and soybean sources. Such products contain significant amounts of such nuts or oil seeds, and may also contain flavorings including salts and sweeteners, water and any other ingredients such as fats and oils included in spreadable products of this type which are homogenized mixtures containing oils, proteins, and carbohydrates in an oily base. The products themselves may be finely ground to a smooth consistency having a particle size of about 30 to 250 microns in diameter or may include visibly solid chunks of nuts or oil seeds.

The product of this invention contains only trace amounts of occluded, dissolved or adsorbed oxygen because solid carbon dioxide, or dry ice, is included during critical preparation stages thereof during which oxidation of oils within the product and damage to other ingredients would otherwise take place when the ingredients are exposed to physical breakdown and heat. Also, the product includes some carbon dioxide gas within the liquid phase of the final, packaged product, thereby serving to prevent oxidation during the period that the product is stored in closed containers. This included carbon dioxide tends to gradually escape from such liquid phase of the final product during the periods that same is exposed to atmosphere, e.g., after the container holding the final product has been opened.

In accordance with the preferred method of this invention, raw peanuts or other raw nuts or oil seeds are graded and sorted as desired and are then roasted in accordance with well-known, commercially utilized techniques. The roasted peanuts or the like are deskinned as necessary and placed, along with solid carbon dioxide, known as dry ice, into a comminutator or other grinding or comminution type of equipment such as a Fitzmill, an Urschel comminutator or a Bauer comminutator. Such equipment is not modified so as to provide an oxygen-free evironment, but is simply open to atmosphere. The dry ice is preferably added as a "powder, " generally ground to a particle size of approximately 500 to 1600 microns in diameter at a weight ratio on the order of one part dry ice for approximately every ten to twenty-five parts by weight of roasted peanuts.

A grinding step is then accomplished by the grinder or comminution equipment so that the peanuts are ground to a particle size on the order of 150 to 1600 microns in diameter. During this step, the dry ice powder maintains the temperature of the ingredients within the approximate range of about 40° to 120° F. (approximately 4° to 50° C), preferably about 60° to 100° F. (approximately 15° to 38° C.). If desired, one or more substantially identical further grinding steps can be accomplished with the peanuts or the like after having been subjected to this initial grinding step. Any such further grinding steps are also carried out with solid carbon dioxide, preferably the dry ice powder.

The next step in the preferred process is one such further grinding step, during which the ground peanuts or the like are reground to the desired final particle size within the approximate range of 30 to 250 microns in diameter. If a natural or so-called old fashioned peanut butter or the like is to be prepared, no additional ingredients are added; otherwise, any other ingredients that are to be included in the final product are added during this further grinding step. Such other ingredients, when included, are flavoring and stabilizing agents, including peanut oil, other vegetable oils, mineral oils, sugars such as dextrose, salts, honey, corn syrup solids, sweeteners, and other flavorings.

In accomplishing this step, the peanuts that had been ground one or more times with dry ice are reground, with or without the flavoring and stabilizing agents, utilizing one of the grinding or comminution types of equipment mentioned above. This further grinding step also takes place with dry ice, preferably added in a powder or ground form, but may instead be accomplished in a system open to an atmosphere of carbon dioxide gas.

When dry ice powder is utilized in this further grinding step, it is added in an approximate weight ratio of about one part dry ice to approximately 20 to 50 parts by weight of ground peanuts or the like plus other ingredients. The grinding temperature is kept at approximately 60° to 120° F. (about 15° to 50° C.), preferably 60° to 100° F. (about 15° to 38° C.). The average particle size of the thus formed smooth type of peanut butter product is within the order of 30 to 250 microns as an average diameter size.

If this further grinding step is not to be carried out, which is within the scope of the present invention, and if it is desired to prepare a product having flavoring and stabilizing agents, such agents are merely mixed or blended into the ground peanuts or the like to form the peanut butter or similar product.

The peanut butter or similar product is then prepared for final packaging. This preparation preferably includes a deaeration step, during which time the peanut butter product or the like is pumped into a closed system, that is, a system from which a substantial quantity of air has been removed through the pulling of a vacuum. Also, in order to accomplish a filling process, the product is usually maintained at a desired filling temperature which may be accomplished utilizing a conventional heat exchanger such as a votator. The preferred filling temperature is within the approximate range of 80° to 100° F. (approximately 27° to 38° C.) so that the peanut butter product is pumpable and has the proper consistency as it enters the ultimate container. The filling operation itself is carried out with conventional flow-filling apparatus into containers of any suitable type or size which are then capped and labeled by conventional means.

The following examples are set forth as illustrative embodiments of the invention and are not to be taken in any manner as limiting the scope of the invention which is defined by the appended claims.

EXAMPLE I

Roasted peanuts were placed into a mill such as a Fitzmill friction grinder along with 10 pounds (about 4.54 Kg.) of dry ice for every 100 pounds of peanuts. Grinding was continued until the resulting ground material had a maximum particle size of about 1/16 inch (about 1600 microns). This grind was then combined with other ingredients in amounts so that the final peanut butter had the following weight percent composition:

| Peanuts | 88.00% |
| --- | --- |
| Peanut oil | 2.30% |
| Salt (200 mesh) | 1.05% |
| Dextrose (200 mesh) | 7.00% |
| Hydrogenated vegetable oil | 1.65% |

The ground peanuts and added ingredients were passed through a further grinding step carried out in an Urschel Comitrol 180 blade microhead comminutor, adding in 5 pounds (about 0.9 Kg.) of dry ice for each 100 pounds of peanuts in the grind. The final temperature of the finished peanut butter product was 100° F. (about 38° C.), which product was then filled into 8 ounce jars by conventional procedures.

EXAMPLE II

The process of Example I was duplicated, except that, contrary to the present invention, the further grinding step was accomplished with no dry ice powder added within the comminutor.

EXAMPLE III

A flavor stability study was run wherein infusion methods were utilized by a panel trained in taste evaluation. The ultimate object of the study was to determine flavor stability of peanut butters prepared by various methods. At substantially monthly intervals, an 8-member expert panel evaluated stored samples. Peanut butters prepared by six different methods were tested. The six methods were:

No. 1. This sample was produced by a method substantially identical with that of Example I herein.

No. 2. This sample was produced by a method along the lines of that of Example II herein.

No. 3. This peanut butter sample was processed in accordance with commercially utilized process in which all grinding and blending steps are accomplished in apparatus used in methods No. 1 and 2, i.e., open to the atmosphere, usually containing air in the headspace of the equipment, but no dry ice is added.

No. 4. A product was prepared in the same manner as method No. 3, except that thereafter the product was frozen in its container so as to enhance the stability of the product.

No. 5. In this process, all headspace was backflushed with nitrogen, utilizing a process such as that disclosed in U.S. Pat. No. 3,266,905. This product was stored at room temperature.

No. 6. The product prepared in accordance with method No. 5 was stored in a frozen state.

Each sample was paneled with each judge receiving only three of the six peanut butter variations. Three panels performed at each evaluation point, with ten opinions per treatment having been obtained. Three representative jars of each method were sampled. Evaluations were made on a 6-point staleness intensity scale, wherein 1.00 equals "no staleness" and 6.00 equals "very much staleness." Tabulated results are as follows:

| Method | Initial | 1 Mo. | 2 Mos. | 3 Mos. | 4 Mos. | 6 Mos. |
| --- | --- | --- | --- | --- | --- | --- |
| No. 1 | 1.10 | 1.00 | 1.90 | 1.40 | 2.00 | 1.70 |
| No. 2 | 1.01 | 1.00 | 1.70 | 2.60 | 2.00 | 2.60 |
| No. 3 | 1.20 | 2.70 | 2.60 | 5.10 | 5.10 | 5.50 |
| No. 4 | 1.20 | 1.20 | 2.30 | 2.50 | 3.30 | 3.30 |
| No. 5 | 1.11 | 1.01 | 1.40 | 1.60 | 1.50 | 1.40 |
| No. 6 | 1.19 | 1.00 | 1.10 | 1.40 | 1.70 | 1.60 |

A statistical interpretation of this data produces the following conclusions relative to the 6-month evaluations.

Conventionally prepared peanut butter No. 3 was significantly more stale (with a Confidence Limit of 99%) than all of the other treatments tested. Its staleness rating fell between much staleness (5.00) and very much staleness, and was accompanied by comments such as "rancid, " "musty, " "stale."

This conventional treatment, even when stored under frozen conditions according to method No. 4, was still significantly more stale than present process No. 1 or prior art nitrogen process stored at room temperature, method No. 5, or under frozen conditions as in method No. 6. It was also established that process No. 4 fit within the intensity rating of "little staleness" (3.00), while these other three products rated between no staleness (1.00) and "very little staleness" (2.00). No significant (Confidence Limit of 90%) staleness intensity differences were established between process No 4 and process No. 2.

As can be seen from the data, process No. 1, the preferred process of the present invention, showed staleness intensity results that are superior to any of Nos. 2, 3 and 4 and that are similar to both process No. 5 and process No. 6, both of which were prepared under the process utilizing the sophisticated apparatus needed for accomplishing the nitrogen backfill of methods No. 5 and No. 6.

On the whole, this series of tests tends to establish that the present process achieves results, as far as maintaining flavor and preventing rancidity over extended periods of shelf storage, that are superior to those of prior art processes in which steps such as grinding are accomplished in an atmospheric environment. This also indicates that the present invention achieves results at least as effective as those utilizing complicated nitrogen backfill apparatus.

Obviously, many modifications and variations of the invention as hereinbefore set forth may be made without departing from the spirit and scope thereof, and only such limitations should be imposed as are indicated in the appended claims.

I claim:

1. A process for manufacturing peanut butter comprising steps of: grinding roasted peanuts together with solid carbon dioxide to form a pumpable peanut butter grind, to an extent such that the grind contains only trace amounts of free oxygen and some included carbon dioxide gas and the grind is simultaneously cooled by said solid carbon dioxide to thereby minimize oxidation and heat damage during said grinding, the grinding being accomplished in an open, atmospheric environment and under atmospheric pressure, said solid carbon dioxide being in an amount such that said simultaneous cooling maintaining a grinding temperature within the approximate range of about 40° to about 120° F.; filling the pumpable peanut butter grind into container, said filling step including maintaining the peanut grind in said pumpable condition by keeping it within a temperature range of about 80° to about 100° F; and sealing such filled containers.

2. The process of claim 1, wherein during the grinding step one part by weight of said solid carbon dioxide is added with from about 10 to 25 parts by weight of said peanuts.

3. The process of claim 1, wherein said temperature range is approximately 60° to 100° F.

4. The process of claim 1, wherein the roasted peanuts are reduced to an average particle size within the range of about 150 to 1600 microns in diameter during said grinding step.

5. The process of claim 1, wherein said solid carbon dioxide is added as a dry ice powder having a particle size of approximately 500 to 1600 microns in diameter.

6. The process of claim 1, further comprising a deaerating step prior to said filling step, said filling step being accomplished under a system that is substantially closed to atmosphere.

7. The process of claim 1, further comprising a further grinding step after the grinding step, said further grinding step being a grinding of said grind in the presence of gaseous carbon dioxide, wherein the particle size of the grind is reduced to about 30 to 250 microns in diameter.

8. The process of claim 7, wherein stabilizing and flavoring agents are added during said further grinding step.

9. A product produced by the process of claim 1, said product being a peanut butter which is an homogenized mixture of oil, protein, and carbohydrate in an oily base.

10. The product of claim 9, wherein said peanut butter product has only trace amounts of free oxygen therein and has gaseous carbon dioxide included in the oily base thereof.

11. The process of claim 1, further comprising a further grinding step after the grinding step, said further grinding step being a grinding of said grind together with a further quantity of solid carbon dioxide.

12. The process of claim 11, wherein said further quantity of solid carbon dioxide is added in the amount of one part by weight of solid carbon dioxide to from about 20 to 50 parts by weight of the total weight of the grind.

13. The process of claim 11, wherein the further grinding step reduces the grind to a particle size of about 30 to 250 microns in diameter.

14. The process of claim 11, wherein flavoring and stabilizing agents are added during said further grinding step.

* * * * *